United States Patent [19]

Plegat

[11] 3,882,956

[45] May 13, 1975

[54] SUSPENSION DEVICE FOR VEHICLE DRIVERS CAB

[75] Inventor: Alain Edouard Plegat, Asnieres, France

[73] Assignee: Societe Anonyme des Usines Chausson, Asnieres, France

[22] Filed: Mar. 28, 1973

[21] Appl. No.: 345,686

Related U.S. Application Data

[63] Continuation of Ser. No. 135,230, April 19, 1971, abandoned.

[30] Foreign Application Priority Data

June 18, 1970 France .............................. 70.22489

[52] U.S. Cl. ............................. 180/89 A; 296/35 R
[51] Int. Cl. ...................... B62d 27/06; B62d 33/06
[58] Field of Search ....... 296/28 C, 35 R; 180/89 R, 180/89 A

[56] References Cited
UNITED STATES PATENTS

| | | | |
|---|---|---|---|
| 2,549,102 | 4/1951 | Kramer | 296/35 R |
| 2,769,656 | 11/1956 | Lee | 296/35 R |
| 3,132,830 | 5/1964 | Adloff | 296/35 R X |
| 3,276,812 | 10/1966 | Fisher | 296/35 R |
| 3,397,910 | 8/1968 | Schmidt et al. | 296/35 R |

*Primary Examiner*—Robert J. Spar
*Assistant Examiner*—Leslie J. Paperner
*Attorney, Agent, or Firm*—Imirie, Smiley & Linn

[57] ABSTRACT

A cab over engine vehicle comprises a frame including spaced side members connected by a cross member spaced rearwardly of the front ends of said side members, an engine unit supported by said frame between said side members, a cab mounted on said frame above said engine when in operating position, means mounting the front end of said cab on the front end of said frame, and means mounting the rear end of said frame on said cross member to enable relative angular movement therebetween constrained about an axis longitudinally thereof.

4 Claims, 2 Drawing Figures

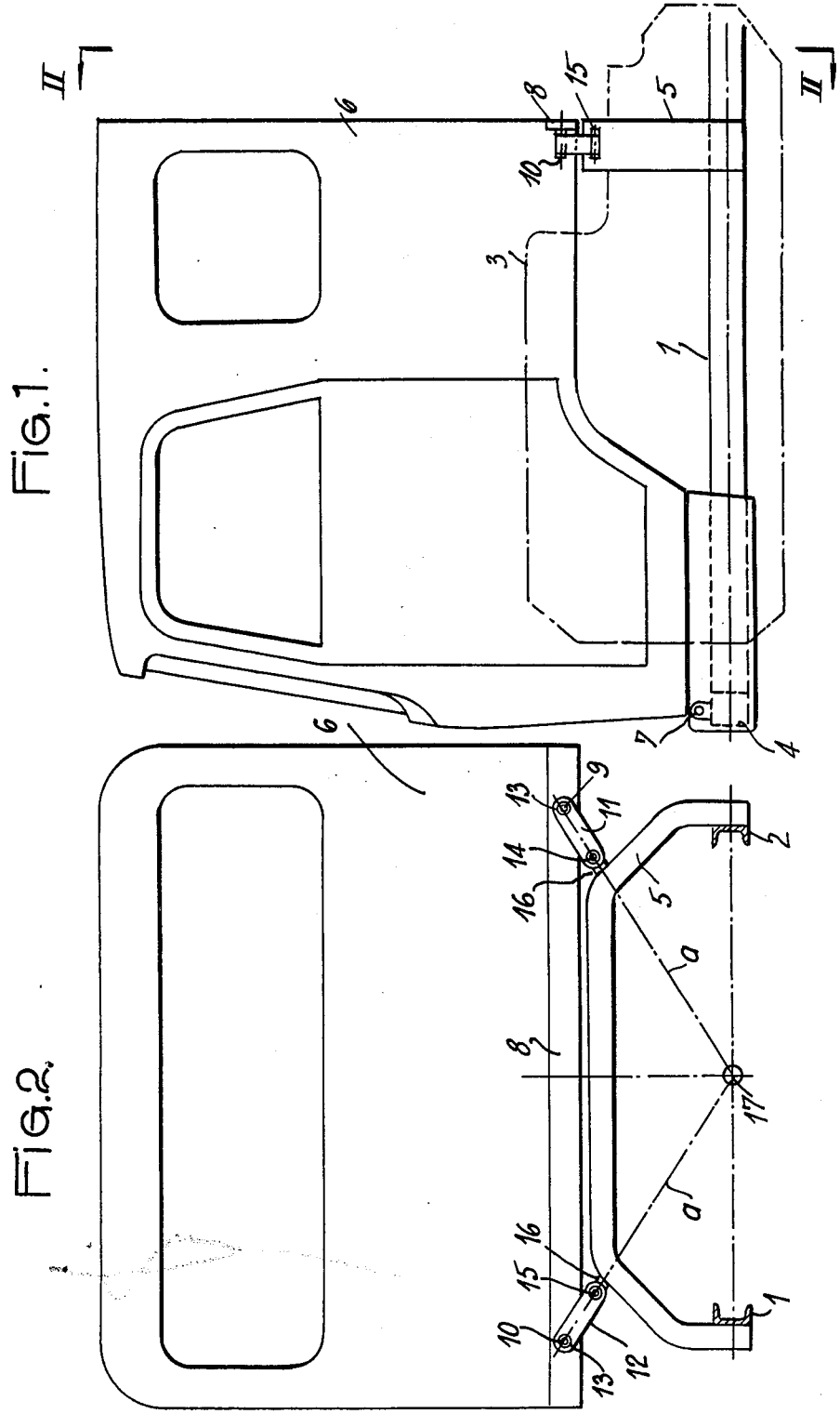

SUSPENSION DEVICE FOR VEHICLE DRIVERS CAB

This is a continuation, of application Ser. No. 135,230, filed Apr. 19, 1971, and now abandoned.

BACKGROUND OF THE INVENTION

The driver's cabs of vehicles, especially cabs of trucks or lorries, are positioned in many instances at the forward end of the frame whilst the engine unit of the vehicle is mounted between the lower section of the side members of the frame in order to occupy minimum space. However, with the engine mounted between the side members, the frame cannot readily be braced by crossmembers in order to afford adequate resistance to the twisting forces to which said side members are subjected. As a consequence, the stresses sustained by the connections which serve to attach the cab to the frame and especially at the rear end of the cab are of such magnitude that failure of said connections frequently occurs. This arises from the fact that a twisting movement applied by the frame to the front portion of a cab tends to be transformed into a translational movement of the rear portion of said cab. The amplitude of such translational movement which takes place transversely with respect to the longitudinal axis of the frame can attain a value of several centimeters and this cannot readily be compensated, even by means of members which have an elastic structure.

SUMMARY OF THE INVENTION

According to the invention, the vehicle frame is provided at the front end with members for fixing the front portion of the cab, said frame being further provided near the rear end of said cab with a cross-member on which the cab is pivotally mounted by links connected to the cab and cross members by pivots, the axes of which each lie in a straight imaginary line, which lines intersect at the longitudinal axis of the frame.

BRIEF DESCRIPTION OF THE DRAWING

FIG. 1 is a diagrammatic side elevation and showing the suspension device for a vehicle cab in accordance with the invention, and FIG. 2 is a diagrammatic cross-sectional view in elevation and taken along line II-II of FIG. 1.

Referring now to the drawing, the front portion of a road vehicle is shown as including a frame comprising side members 1 and 2 connected at their front ends by at least one cross-member 4, an engine unit 3 being supported between said members. In addition, said side members are connected rearwardly of the member 4 by at least one crossmember 5 which is arched over the rear portion of the engine unit 3 to which is coupled a gear-box, a clutch mechanism and various control components.

The driver's cab 6 must be supported by the frame 1 above the engine unit 3. In accordance with the invention, said cab is supported at the front end by connectors 7 which can permit pivotal attachment if the cab is intended to tilt forward in order to provide ready access to the engine unit. At the rear end, the cab is connected to a cross-member 8, the cab resting on said cross-member and being locked to this latter either by means of detachable elements in the case of a pivoting cab or by means of fixed elements if said cab is not intended to be of the tilting type; in the case last mentioned, the cross-member 8 can also form an integral part of the cab. The cross-member 8 is fitted with two pins 9 and 10 on which are pivotally mounted links 11 and 12 respectively by means of damping members such as rubber cushions 13 of the "silent-block" type. Similarly, the links 11 and 12 are pivotally mounted on pins 14 and 15 respectively and these latter are carried by lugs 16 which are attached to the cross-member 5.

The links are inclined inwardly and downwardly, as shown in FIG. 2, the positions of the pins 9 and 14 in the case of the link 11, and of the pins 10 and 15 in the case of the link 12 being so determined that imaginary straight lines $a$ which pass respectively through the pivotal axes of the two links meet at a common point 17 which coincides with the longitudinal axis of the frame. Thus, when the frame is subjected to twisting movements having an amplitude which can sometimes attain two to three degrees at the front end, said frame consequently tends to rotate about its longitudinal axis. This corresponds to a pivotal movement which causes the pins 14 and 15 of the links 11 and 12 to describe circular arcs having the same radius and the same center. As a consequence, the twisting movements to which the frame is liable to be subjected are not transmitted to the cab which is thus suitably isolated.

As shown in FIG. 2, it is clearly important to ensure that the top face of the cross-member 5 should be located at a sufficient distance from the underface of the cross-member 8 or from the corresponding portion of the cab if no provision is made for said cross-member and that the cab should have a self-supporting structure.

The invention is not limited to the exemplified embodiment which has been described in detail with reference to the drawing since a number of different modifications can be contemplated without thereby departing from the scope of this invention. In particular, the two links can be inclined to each other at any desired angle or, in other words, the pins 9 and 10 can be placed at a greater or smaller distance from the longitudinal axis of the cab, the only condition being that said links should be directed towards the point 17.

I claim:

1. A car over engine vehicle comprising a frame including spaced side members interconnected by a front end member and a cross-member spaced rearwardly of said front end member, said frame having a longitudinal axis about which twisting of the frame occurs during movement of the vehicle, and an engine unit supported by said frame between said side members, and a cab mounted on said frame above said engine unit when in operating position, said cab being mounted at its front end of said frame adjacent said front end member, and means mounting the rear end of said cab on said cross-member for constraining said cab and said cross-member to preclude movement therebetween normal to said longitudinal axis while enabling relative angular movement therebetween about said longitudinal axis, said means comprising exclusively a pair of rigid links, one at each side of said frame, supporting said cab in spaced relation above said cross-member, said links connected by pivot means to said cab and to said cross-member for unimpeded relative motion therebetween, the pivots for each link being spaced vertically in the same direction from the longitudinal axis of the frame, and said links being disposed, when the cab is in normal operating position, so that imaginary straight lines passing through the pivot axes of the respective links intersect at the longitudinal axis of the frame so that the rear of the cab can pivot relative to the frame and crossbar about said longitudinal axis to eliminate twisting of the cab as a result of twisting of the frame.

2. The invention as recited in claim 1 wherein said cross-member is curved and is disposed above said engine unit.

3. The invention as recited in claim 1 including pivotal attachment means mounting said cab to said frame adjacent said front end member; and wherein said rear end mounting means further includes detachable locking means coupling said cab to said links whereby said cab may be displaced in pivotal motion about said pivotal attachment means.

4. The invention as recited in claim 1 wherein said links support said cab in spaced relation with respect to said cross-member whereby said cab may be angularly displaced about said longitudinal axis.

* * * * *